(12) United States Patent
Hendricks et al.

(10) Patent No.: US 6,387,274 B1
(45) Date of Patent: May 14, 2002

(54) SYSTEM AND METHOD FOR THE REMOVAL OF RADIOACTIVE PARTICULATE FROM LIQUID WASTE

(75) Inventors: Scott H. Hendricks, Kensington, NH (US); Stephen F. Liebenow, Columbia, SC (US)

(73) Assignee: Chem-Nuclear Systems, LLC, Lakewood, CO (US)

( * ) Notice: Subject to any disclaimer, the term of this patent is extended or adjusted under 35 U.S.C. 154(b) by 0 days.

(21) Appl. No.: 09/537,067

(22) Filed: Mar. 28, 2000

(51) Int. Cl.$^7$ ............................. C02F 1/52; C02F 9/02
(52) U.S. Cl. ..................... 210/709; 210/682; 210/746; 210/806; 210/912; 588/20
(58) Field of Search ................ 210/96.1, 101, 210/198.1, 258, 259, 266, 662, 663, 669, 709, 746, 806, 900, 284, 682, 688, 912; 324/453; 588/20

(56) References Cited

U.S. PATENT DOCUMENTS

| | | |
|---|---|---|
| 3,365,376 A | 1/1968 | Weyland |
| 3,368,145 A | 2/1968 | Gerdes |
| 3,399,133 A | 8/1968 | Gerdes et al. |
| 3,594,313 A | 7/1971 | Carlson |
| 3,605,775 A | 9/1971 | Zaander et al. |
| 3,693,797 A | 9/1972 | Topol .................. 210/96.1 |
| 4,033,868 A | 7/1977 | Meichsner et al. ......... 210/200 |
| 4,434,074 A | 2/1984 | Fox et al. |
| 4,446,435 A | 5/1984 | Canzoneri ................ 324/453 |
| 4,855,061 A | 8/1989 | Martin ..................... 210/709 |
| 4,983,302 A * | 1/1991 | Balint et al. .............. 210/682 |
| 4,983,306 A * | 1/1991 | Deininger et al. .......... 210/912 |
| 5,064,531 A * | 11/1991 | Wang et al. ............... 210/266 |
| 5,069,783 A * | 12/1991 | Wang et al. ............... 210/266 |
| 5,076,936 A * | 12/1991 | Metz ..................... 210/682 |
| 5,202,016 A | 4/1993 | Church et al. ............. 210/709 |
| 5,240,600 A * | 8/1993 | Wang et al. ............... 210/259 |
| 5,540,845 A | 7/1996 | Blanchard et al. .......... 210/709 |
| 5,707,922 A * | 1/1998 | Mimori et al. ............. 588/20 |
| 5,832,393 A * | 11/1998 | Omata et al. .............. 588/20 |
| 6,085,911 A * | 7/2000 | Greenleigh et al. ......... 210/638 |

* cited by examiner

Primary Examiner—Joseph W. Drodge
(74) Attorney, Agent, or Firm—McDonnell Boehnen Hulbert & Berghoff

(57) ABSTRACT

A wastewater treatment system and process for removal of radioactive particulates includes continuous monitoring of charged particles and the addition of chemicals to coagulate and cause removal of the particulates from the wastewater.

6 Claims, 1 Drawing Sheet

SYSTEM AND METHOD FOR THE REMOVAL OF RADIOACTIVE PARTICULATE FROM LIQUID WASTE

BACKGROUND OF INVENTION

This invention relates to wastewater treatment and, particularly, to the removal of radioactive particulate from liquid waste streams, particularly those generated at nuclear facilities. These radioactive particulates include organics and radioactive isotopes. In addition to the nuclear industry, our invention finds application in other industries that produce wastewaters containing radioactive material. Environmental laws regulate the discharge of wastewater containing such radioactive particulates. Radioactive isotopes result from nuclear power generation, mining ore, refining ore, milling, wash-downs, fuel preparation, cooling waters, as well as from hospitals and research facilities.

The problem addressed by our invention relates to the considerable volume of wastewaters that contain the above-mentioned contaminates throughout the world and the lack of effective, safe and economical treatment system and method.

The present invention obviates these inherent problems by providing a system and method for the continuous removal of radioactive particulate, thus rendering the wastewater free of radioactive material. These waters can then be safely discharged or, in many cases, recycled, which results in additional savings and in the preservation of natural resources, the public health and the environment.

SUMMARY OF THE INVENTION

The general object of the present invention is to provide a treatment system and method for the removal of contaminate particulates from liquid waste streams, in particular radioactive particulates. Our system for the continuous removal of radioactive particulates from a liquid waste stream comprises, a feed pump for introducing a liquid waste stream containing radioactive particulates into a treatment zone at an upstream position, a chemical addition pump, a static mixer, at least one filter, a sample port connected to a charge detector for measuring the particle charge of the liquid waste stream, a series arrangement of vessels each containing media, and a controller unit responsive to the measured particle charge of the liquid waste stream and connected to the chemical addition pump.

The method of our invention comprises treating a liquid waste stream comprising radioactive particulates in an optional bed of activated carbon to form a carbon treated stream, injecting a coagulant into the carbon treated stream, mixing the coagulant and carbon treated stream to form an admixture stream, passing the admixture stream through a first filter to remove coagulated particulates, continuously monitoring the admixture stream for the presence of charged particles and automatically controlling the injection of coagulant into the carbon treated stream, introducing the admixture stream after filtration into a series of vessels containing media, passing the admixture after contact with the media through a second filter to form a substantially particulate-free stream, and disposing of the particulate-free stream.

These and other objects and advantages of the present invention will become more fully apparent from the following detailed description when read in conjunction with the accompanying drawings.

DESCRIPTION OF A PREFERRED EMBODIMENT

Figure 1:
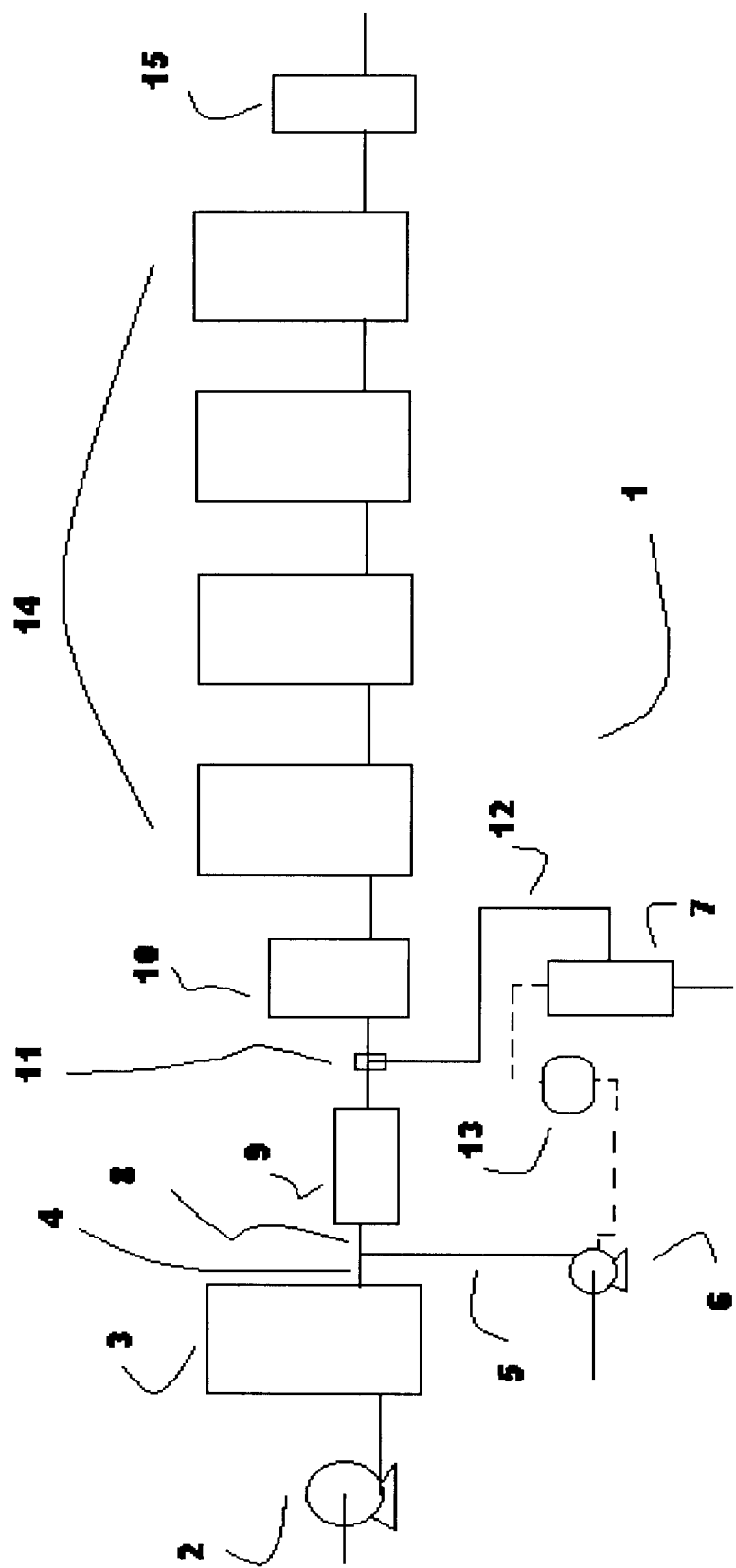
FIG. 1 is a schematic representation of one embodiment of our invention showing a process flow scheme and the equipment needed for the coagulation, precipitation and filtration of radioactive particulates from a liquid waste.

The system and method of our invention that allows for the continuous removal of radioactive particulate from a liquid waste stream is dependant on the monitoring of the particle charge of the incoming liquid waste and the addition and adjustment of the chemicals needed to coagulate the particles for removal. Maintaining and measuring the charge particles in liquid streams is accomplished using an instrument called a particle charge detector, also known as a streaming charge detecor. Such instruments are well known and have been used in the waste industry, but only for treating non-radioactive municipal and industrial wastewater effluents. We have surprisingly found that the use of such a particle charge detector with liquid wastes containing radioactive materials will provide large advantages over conventional treatment processes used to treat radioactive liquid wastes.

A critical issue in the design and use of liquid waste treatment process containing radioactive particulate is the selection and rate of addition of an appropriate coagulant(s). As the name implies, coagulants are special chemicals that cause particulate materials suspended in liquids to coalescence and fall out of solution and thereby become filterable. The appropriate amount of coagulant to be added to a liquid waste depends on the amount and charge separation of the suspended particulate matter. To determine the charge of the ionic material in the liquid waste, a particle charge or streaming current detector is used. It is very important to determine the charge density of a liquid waste stream because resistance to filtration is directly related to the charge density. Although any particle charge detection apparatus will work with our invention, a preferred apparatus is the Mutek PCD 03.

Referring now to the drawing, there is shown in FIG. 1 an improved wastewater treatment system constructed in accordance with the principles of our invention. The particular embodiment shown is designed to treat a liquid waste containing radioactive particulates obtained from wastewater generated at a nuclear power plant. The system 1 includes feed pump 2 which supplies the liquid waste stream from a storage tank, sump or other vessel (not shown) used to hold the wastewater containing radioactive particulates obtained from various location within the nuclear plant facility. As used herein, the term "upstream" is to denote a spatial direction with respect to the various pieces of process equipment and in a direction towards the the front end of the process where the liquid waste is pumped into the system. Likewise the term "downstream" is used to denote a direction towards the backend of the process. For example, feed pump 2 is upstream of static mixer 9 and filter 10 is downstream of both the mixer 9 pump 2.

Feed pump 2 supplies the liquid waste to the treatment system 1 at an operating pressure of from about 110 to about 130 psig and at a flow rate of about 30 gpm, however, flow rates up to 75 gpm are possible. The temperature of the liquid waste is not critical and is typically ambient. The liquid waste initially flows through optional carbon bed 3. Typically, activated granular carbon is used in optional carbon bed 3 to remove dirt, turbidity, color, oil and large particulates present in the wastewater. Carbon bed 3 can be a cylindrical vessel about 36 inches in diameter and holding about 30 cubic feet of activated carbon. Although activated carbon is the preferred media for removal of above-named contaminants, any equivalent media can be used to accomplish this filtering process.

In those circumstances when carbon bed 3 is used, the outlet 4 is connected to the outlet 5 of chemical addition pump 6. When carbon bed 3 is not used, the outlet from the chemical addition pump is connected directly to the outlet of feed pump 2.

Chemical addition pump 6 is used to add/inject a measured quantity of coagulant, flocuant or other chemicals into the liquid waste being treated by the system of our invention. Typically it is preferred to have chemical addition pump 6 operate at about 1 to 4 liters per hour. The rate of chemical addition and, thus the quantity of a given chemical, is controlled by varying the speed or flow rate of the chemical addition pump 6. As will be explained in more detail below, the chemical addition pump 6 receives process signals from a controller unit that responds to the measured charge density of the liquid waste as determined by particle charge detector 7. The particle charge detector measures the net ionic and particulate surface charge (positive and negative) of the liquid waste stream. If the detector senses a charge different from its calibrated set point, normally zero, it will send a signal to the chemical injection pump to add a predetermined concentration of coagulant to the liquid waste stream. The detector will then control the chemical addition to maintain a predetermined charge set point in the liquid waste stream. The admixture of injected chemicals from pump 6 and liquid waste in stream 8 is then statically mixed using an inline static mixer 9. Any type of inline static mixer can be used, preferably one manufactured by Ross having a 2 inch diameter. The purpose of the static mixture is to ensure that the added chemicals are intimately mixed with the liquid waste to form a homogenous mixture.

The preferred chemical added by chemical addition pump 6 is a liquid coagulant, preferably an organic cationic coagulant. Most preferred is a liquid organic cationic coagulant manufactured by Nalco and sold under the trade name Nalcolyte®. The cationic coagulant acts in two ways, charge neutralization and bridging. Charge neutralization involves adsorption of a positively charged coagulant on the surface of charged particle. This charged surface coating neutralizes the negative charge of the particle, resulting in a near zero net charge. The uncharged particles are free to collide and aggregate. These aggregates are larger, making removal by filtration possible. Bridging occurs when the coagulant forms threads of fibers, which attach to several particles, capturing and binding them together. Again, due to increase size, mechanical filtration is possible. After the liquid waste and added chemicals are mixed in the static mixer 9, the resultant mixed stream is filtered to remove the coagulated particulates formed as a result of the added chemicals. FIG. 1 shows one such possible filtering process, using a cartridge media filter 10. The filter media must be sized small enough to capture the smallest particulate, yet not too small such that a large pressure drop occurs. Preferably a 1–5 micron filter cartridge manufactured and sold by U.S. Filter Corporation is used. Immediately upstream of filter 10 is sample port 11. Sample port 11 is used to draw a sample of the liquid waste after contact with the added chemicals.

As shown in FIG. 1, sample port 11 is connected, via line 12, to particle charge detector instrument 7, also known as a streaming current detector. In this configuration, detector 7 can easily and continuously sample the liquid waste stream. As stated above, the detector is arranged in combination with a controller 13, which in turn is electrically connected to chemical addition pump 6. The streaming charge detector 7 is typically initially calibrated and adjusted to a desired net charge value (such as a neutral charge or 0 reading) and controller 13 is then programmed to maintain that charge value as a set point by adjusting the dosage rate of the chemical addition pump 6. A detected increase in charged particle concentration produces a negative reading while a decrease in particle concentration prompts a positive reading. The controller 13 responds to the reading by changing the dosage rate of pump 6 accordingly.

Downstream of the filter 10 is a series of vessels 14 that contain various media, such as ion exchange resin, to remove ionic ions that have passed through mechanical filtration. These vessels are normally used at all times. The first two beds contain strong acid cation exchange resin. The sulfonic acid group is in the hydrogen form. When the resin is in contact with a liquid containing other cations, hydrogen ions leave the solid phase and enter the liquid phase as they are replaced by cations from the liquid phase. The next two beds contain strong base anion exchange resin. The quatemary amine group is in the hydroxide form. Other types of ion exchange media can be used depending on chemistry requirements.

The effluent from the series arrangement of vessels 14 is then optionally passed through a second cartridge filter 15, this one with a smaller pore size in the range of 0.1 micron. This final filtration ensures that miscellaneous particulate matter, such as cracked or broken resin beads, do not exit the process of our invention.

Having illustrated and described the principles of the invention in the above-described preferred embodiment, it should be apparent to those skilled in the art that the invention can be modified in arrangement and detail without departing from such principles. We claim all modifications coming within the spirit and scope of the following claims.

We claim:

1. A system for the continuous removal of radioactive particulates from a liquid waste stream comprising the following equipment arranged in the following order, a feed pump for introducing a liquid waste stream containing radioactive particulate into a treatment zone containing filtering media at an upstream position;

a chemical addition pump for continuously adding a coagulant to the liquid waste stream;

a static mixer;

a sample port located on the liquid waste steam upstream of any filters and connected to a charge detector for measuring the particle charge of the liquid waste stream;

at least one filter;

a series arrangement of continuous flow vessels each containing media; and a controller unit responsive to the measured particle charge of the liquid waste stream and connected to the chemical addition pump.

2. The system of claim 1, wherein the treatment zone comprises a carbon bed.

3. The system of claim 1 wherein the media comprises ion exchange resin.

4. A method for the continuous removal of radioactive particulates from a liquid waste stream comprising, a. continuously injecting a coagulant into a continuously flowing liquid waste stream comprising radioactive particulates;

b. mixing the coagulant and the liquid waste stream at ambient temperature using an inline static mixer in the flowing liquid waste stream without the use of a static mixing tank to form a flowing admixture stream;

c. passing the flowing admixture stream directly through a first filter to remove coagulated particulates;

d. continuously monitoring the admixture stream for the presence of charged particles and automatically controlling the continuous injection of coagulant into the liquid waste stream;

e. introducing the admixture stream after filtration into a series of vessels containing media;

f. passing the admixture after contact with the media through a second filter to form a substantially particulate-free stream; and g. disposing of the particulate-free stream.

5. The method of claim 4 wherein the liquid waste stream comprising radioactive particulates is continuously passed through a bed of activated carbon to form a carbon treated stream prior to injection with the coagulant.

6. The method of claim 4 wherein the admixture is contacted with ion exchange resin in the series of vessels.

* * * * *